(12) United States Patent
Sirohi et al.

(10) Patent No.: US 11,188,067 B2
(45) Date of Patent: Nov. 30, 2021

(54) METHOD AND SYSTEM FOR ELIMINATION OF FAULT CONDITIONS IN A TECHNICAL INSTALLATION

(71) Applicants: Ajay Sirohi, New Delhi (IN); Shamim Alam, New Delhi (IN)

(72) Inventors: Ajay Sirohi, New Delhi (IN); Shamim Alam, New Delhi (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 66 days.

(21) Appl. No.: 16/699,374

(22) Filed: Nov. 29, 2019

(65) Prior Publication Data
US 2020/0174462 A1 Jun. 4, 2020

(30) Foreign Application Priority Data
Nov. 30, 2018 (EP) .................... 18209564

(51) Int. Cl.
*G05B 23/02* (2006.01)
*G05B 13/02* (2006.01)
*G05B 13/04* (2006.01)

(52) U.S. Cl.
CPC ....... *G05B 23/0254* (2013.01); *G05B 13/027* (2013.01); *G05B 13/042* (2013.01); *G05B 23/0297* (2013.01)

(58) Field of Classification Search
None
See application file for complete search history.

(56) References Cited

U.S. PATENT DOCUMENTS

2002/0022952 A1* 2/2002 Zager ................ H04L 41/0233
703/22
2005/0132253 A1* 6/2005 Gail .................... G06F 11/0709
714/25

(Continued)

FOREIGN PATENT DOCUMENTS

EP 2757648 A2 7/2014

OTHER PUBLICATIONS

European Search Report for European Patent Application No. 18209564.6-1204 dated May 24, 2019.
(Continued)

*Primary Examiner* — Mohammad Ali
*Assistant Examiner* — David Earl Ogg
(74) *Attorney, Agent, or Firm* — Lempia Summerfield Katz LLC

(57) ABSTRACT

A method and system for eliminating a fault condition in a technical installation is provided. In one aspect, the method includes predicting an occurrence of the fault condition in at least a portion of the technical installation. The method also includes determining a root cause of the predicted fault condition. Additionally, the method includes identifying one or more mitigation actions to resolve the fault condition. Furthermore, the method includes determining an outcome associated with at least one of the one or more mitigation actions on the technical installation. The method also includes outputting on a device associated with a user at least one mitigation action to be implemented in the technical installation based on the determined impact.

14 Claims, 6 Drawing Sheets

(56) References Cited

U.S. PATENT DOCUMENTS

| | | | | |
|---|---|---|---|---|
| 2008/0010531 A1* | 1/2008 | Hendler | ............ | G05B 23/0281 |
| | | | | 714/33 |
| 2009/0113049 A1* | 4/2009 | Nasle | ................ | G05B 19/0428 |
| | | | | 709/224 |
| 2009/0172460 A1* | 7/2009 | Bobak | ................ | G06F 11/1482 |
| | | | | 714/2 |
| 2012/0215352 A1* | 8/2012 | Eberst | ............... | G05B 19/4083 |
| | | | | 700/253 |
| 2019/0324441 A1* | 10/2019 | Cella | ................ | G05B 19/4184 |
| 2020/0257277 A1* | 8/2020 | Kimura | ................ | G05B 17/02 |

OTHER PUBLICATIONS

Portinale, Luigi, and Daniele Codetta-Raiteri. "Using dynamic decision networks and extended fault trees for autonomous fdir." 2011 IEEE 23rd International Conference on Tools with Artificial Intelligence. IEEE, 2011. pp. 480-484.

* cited by examiner

| 100 | Industrial set-up | 110 | Fault elimination module |
| 102 | Cloud platform | 112 | Technical database |
| 104A-N | Devices/components | 114 | Network interface |
| 106A-N | Assets | 116A-F | Communication links |
| 107 | Technical installation | 120A-N | Communication interfaces |
| 108 | User Device | | |

| | |
|---|---|
| 102 | Cloud platform |
| 110 | Fault elimination module |
| 112 | Technical database |
| 114 | Network interface |
| 201 | Processing unit |
| 202 | Memory |
| 203 | Storage unit |
| 207 | Interface/Bus |

METHOD AND SYSTEM FOR ELIMINATION OF FAULT CONDITIONS IN A TECHNICAL INSTALLATION

PRIORITY CLAIM

This patent application claims the benefit of European Patent Application No. 18209564.6 titled "Method and system for elimination of fault conditions in a technical installation," filed Nov. 30, 2018, which is hereby incorporated by reference in its entirety.

FIELD OF TECHNOLOGY

The present disclosure relates to a method and system for elimination a fault condition in a technical installation.

BACKGROUND

A technical installation or an industrial setup such as a power plant or a refinery includes a plurality of field devices or components. Each component may be a part of an industrial process required for the efficient functioning of the technical installation. Such components and processes, therefore, play an important role in the technical installation. The performance of the components and the efficiency of the processes increase the reliability of the technical installation and reduce overall energy consumption, service and maintenance cost of the technical installation. Therefore, the lifecycle and the safety of the technical installation are increased, thereby reducing the life-time maintenance cost of the technical installation. Currently, detection of a fault condition in a component or process of the technical installation is performed by machine learning model-based monitoring systems. Such model-based training systems perform continuous evaluation of several parameters associated with the components and processes and generate alarms for a user so that necessary action if a deviation is identified.

However, use of such model-based systems depends on how well the model has been trained. Insufficient training data may cause the model to incorrectly identify a fault, resulting in a shutdown of the technical installation. Additionally, current machine learning model-based systems are only capable of generating alarms for a detected fault condition. This does not provide the root cause analysis of the fault condition. Therefore, identifying a mitigation action is difficult. Furthermore, existing model-based systems do not test the impact of a mitigation action before being implemented in the technical installation. Therefore, there is no way of predicting if the mitigation action would efficiently correct the fault condition.

SUMMARY AND DESCRIPTION

An improved and intelligent fault detection system in a technical installation that is capable of accurately identifying the cause of the fault condition and efficiently determines the impact of the mitigation action before the implementation of such mitigation action in the technical installation is disclosed.

In one aspect, a method and a system for elimination of a fault condition of a device in a technical installation that performs an impact analysis of a proposed mitigation action before implementation in the technical installation is disclosed.

This is achieved by a method of elimination a fault condition of a device in a technical installation, a system, a computer program product, and a non-transitory computer readable medium which determines an outcome associated with the mitigation action on the technical installation.

In the following, the solution is described with respect to the system as well as with respect to the method. Features, advantages, or alternative embodiments herein may be assigned to the other objects and vice versa. In other words, the system may be improved with features described in the context of the method. In this case, the functional features of the method are embodied by objective units of the system.

Based on the abovementioned method, the disclosure achieves the object by determining an outcome associated with at least one of the one or more mitigation actions on the technical installation; and outputting on a device associated with a user at least one mitigation action to be implemented in the technical installation based on the determined impact. An advantage of the disclosure is that determining the impact of the mitigation action on the technical installation improves the reliability on the components and processes in the technical installation. Yet another advantage is that determining the outcome of the mitigation action before implementation in the technical installation enables reduction of time and effort in resolving the fault condition.

A method of eliminating a fault condition in a technical installation is disclosed. The method includes determining the fault condition of at least one device in the technical installation. A fault condition may be an abnormality or a defect in a device, component, unit or an equipment of the technical installation or a portion of the technical installation. The abnormality may also be caused due to an error in a process executed in the technical installation. Such abnormality may affect the functioning of the technical installation or in complete failure of the technical installation. Efficient identification of the fault condition enables accurate determination of corresponding mitigation actions. The method further includes determining a root cause of the predicted fault condition. A root cause of the fault condition may be the main factor or the initiating factor which causes a non-conformance in the device. Determination of the root cause of the fault condition enables accurate identification of mitigation actions to resolve such fault condition. The method further includes identification of one or more mitigation actions to resolve the fault condition. A mitigation action is an act or a process implemented to reduce or eradicate risk to human life and property from one or more events. Therefore, identification of one or more mitigation actions enables resolution of the fault condition, thereby allowing the technical installation to function efficiently. The method further includes determining an outcome associated with at least one of the one or more mitigation actions on the technical installation. The mitigation action, when implemented, may cause an effect in the technical installation, as an outcome. Determination of the effect of the mitigation action on the technical installation is important so as to identify if the preferred outcome of the mitigation action is achieved. Early identification of the outcome of the mitigation action enables effective utilization of time and resources in maintenance of the technical installation. The method further includes outputting the at least one mitigation action on a device associated with a user. If the outcome of the mitigation action is the preferred outcome, such mitigation action is outputted on the device associated with the user of the technical installation. Such user may be any entity responsible for the functioning and maintenance of the technical installation. Advantageously, the user of the technical installation is informed of the mitigation action in due time. Therefore, the implementation of the mitigation action is enabled efficiently.

In predicting the occurrence of the fault condition, the method includes obtaining sensor data from the one or more sensors installed in the technical installation. Such one or more sensors may be configured to collect one or more parameter values associated with the at least one device in the technical installation. The sensor data may include real-time data associated with the device in the technical installation and such one or more parameter values may be associated with an event. The event may be, for example, associated with the fault condition. The event may be any occurrence or an activity in at least one portion of the technical installation. The event may be a part of an industrial process in the technical installation and may be associated with the functioning of a component forming a part of the industrial process. The parameters may be, for example, temperature, pressure, level of a fluid, etc. The method further includes processing the obtained sensor data by a suitable machine learning model. Such machine learning model may be, for example, a neural network-based model that may be capable of processing the sensor data to predict the fault condition of the device based on historical and real-time data associated with the device in the technical installation. The method further includes predicting the fault condition using one or more machine learning techniques. The machine learning model may employ one or more machine learning techniques to predict the fault condition of the device. Such one or more machine learning techniques may include supervised and unsupervised learning techniques. Advantageously, prediction of the fault condition of the device enables the user of the technical installation to initiate necessary actions before the actual fault condition develops in the device. Therefore, any loss and damage to the device in the technical installation is avoided.

In processing the obtained data, the method includes obtaining an engineering data associated with the technical installation. Such engineering data may include, for example, function diagrams, plant displays, compound components, prototypes, runtime container types, runtime container numbers, peer to peer communication details, and types of automation servers. The method further includes obtaining data from a piping and instrumentation diagram associated with the technical installation. Such piping and instrumentation diagram indicates one or more piping, vessels and components in a process flow along with instrumentation and control devices. The method further includes determining a type of industrial process being executed in the at least one portion of the technical installation based on the engineering data. The method also includes identifying one or more components in the at least one portion of the technical installation. Such components may be a part of the determined industrial process. The industrial process may include several executable acts that may result in a specific outcome. Accurate and efficient execution of each of the executable acts is important for the functioning of the technical installation. The one or more components may be determined from the piping and instrumentation diagram. In an embodiment, the industrial process and/or the associated components may be identified using, for example, one or more tag information. The industrial processes and components in a technical installation may be associated with a tag information. Such tag information may include data related to, for example, process related identification, point of installation within installation units, location identification, etc. Therefore, such tag information may enable accurate determination of the fault condition. The method includes identifying a fault signal associated with the event. Such fault signal may be identified based on the sensor data. The method further includes mapping the fault signal to at least one of the one or more components and/or the type of the industrial process. Advantageously, the mapping of the fault signal to the components and/or the industrial process enables accurate prediction of the fault condition. Yet another advantage of the method is that the location of the fault condition is determined accurately in the technical installation.

In identifying the fault signal, the method includes comparing the real-time parameter values with a pre-defined threshold value. Each parameter may have a pre-defined optimum value or a threshold value. A deviation in parameter value from such pre-defined threshold value may cause an abnormality in the industrial process or in the functioning of the technical installation. The pre-defined threshold value may be stored, for example, in the technical database. The method further includes determining if there is a deviation between the parameter values and the pre-defined threshold value. Such deviation may correspond to the fault signal.

The root-cause of the predicted fault condition is determined using a decision matrix. According to an embodiment, determination of the root cause of the fault condition using a decision matrix includes obtaining an engineering data associated with the technical installation. Such engineering data may include, for example, function diagrams, plant displays, compound components, prototypes, runtime container types, runtime container numbers, peer to peer communication details, and types of automation servers. The method further includes obtaining data from a piping and instrumentation diagram associated with the technical installation. Such piping and instrumentation diagram indicates one or more piping, vessels and components in a process flow along with instrumentation and control devices. The method further includes determining a type of industrial process being executed in the at least one portion of the technical installation based on the engineering data. Such industrial process may be associated with the event. The industrial process may include several executable acts that may result in a specific outcome. Accurate and efficient execution of each of the executable acts is important for the functioning of the technical installation. The method also includes identifying one or more components in the at least one portion of the technical installation. Such components may be a part of the determined industrial process. The one or more components may be determined from the piping and instrumentation diagram. In an embodiment, the industrial process and/or the associated components may be identified using, for example, one or more tag information. The industrial processes and components in a technical installation may be associated with a tag information. Such tag information may include data related to, for example, process related identification, point of installation within installation units, location identification, etc. Therefore, such tag information may enable accurate determination of the fault condition. The method includes generating a questionnaire based on the identified one or more components and the type of industrial process and determining from the questionnaire the root cause of the fault condition in the technical installation. The decision matrix may use, for example, a decision tree flow. A questionnaire may be used to generate decision tree nodes. The questionnaire may be based on the tag information associated with the one or more components in the technical installation. Each decision tree node may process an internal node question and provide an output.

Such output may be in the form of a branch, wherein such branch may have further sub-nodes. The decision tree branches may include options such as "Yes" and "No" for answers. If the answer to an internal node question is "Yes", a subsequent branch of the decision tree may be created. Such branch of decision tree may be created until the associated faulty components are identified. Alternatively, the decision tree may indicate the faulty component associated with the fault condition. The mapped component, therefore, advantageously indicates the fault condition.

A root cause analysis report may be created. Such report may include data associated with the one or more components and the industrial process associated with the technical installation determined using the decision matrix. Advantageously, the root cause analysis report provides the user of the technical installation concise information of the predicted fault condition and the associated cause.

In determining the outcome associated with at least one of the one or more mitigation actions, the method includes implementing one of the one or more mitigation actions in a virtual model of the technical installation. The virtual model may be a digital twin of the technical installation that is capable of simulating the functions of the technical installation. Such virtual model may be based in a cloud environment. In an embodiment, all the data associated with the functioning of the technical installation may be stored in the cloud environment. Such data may be used by the virtual model to simulate the functions of the technical installation. Advantageously, simulation of the functions of the technical installation enables timely identification of the appropriate mitigation action to mitigate the fault condition. The use of a virtual model further enables effective utilization of time and resources, thereby preventing wastage of effort in implementing an incorrect mitigation action in the technical installation. Therefore, the virtual model allows for prediction of the outcome of the mitigation action before such mitigation action is implemented in the technical installation in real-time. Implementation of the mitigation action may include executing the mitigation action in the virtual model. The method further includes predicting using the virtual model an effect of the mitigation action on the technical installation. The virtual model may perform, for example, a predictive analysis based on the archived data and real-time information received from the technical installation. The predictive analysis may be based on patterns identified from the archived data, thereby enabling assessment of risk and potential associated with the mitigation action.

The method includes determining if the outcome of the implemented action is a preferred outcome. The effect caused by the implementation of the mitigation action in the virtual model of the technical installation enables identifying if the outcome of the mitigation action is the preferred outcome. The preferred outcome may include an outcome which generates a desired result in the technical installation, such that the fault condition is resolved. Alternatively, the preferred outcome may also include an outcome which furthers the cause of resolution of the fault condition in the technical installation. If the outcome is the preferred outcome, the mitigation action is outputted on the device associated with the user of the technical installation. The user of the technical installation may be informed of the preferred mitigation action so as to enable efficient and timely resolution of the fault condition. The output may be in the form of, for example, a notification on the device associated with the user. In an embodiment, such notification may include the details of the mitigation action, and a graphical user interface-based option to proceed with the implementation of the mitigation action in the technical installation. In an embodiment, if the outcome of the mitigation action is not the preferred outcome, another mitigation action from the one or more mitigation actions may be implemented in the virtual model. Advantageously, the outcome of the mitigation action may be predicted before the actual implementation of the mitigation action in the technical installation. Furthermore, if the preferred outcome is not achieved, the implementation of an alternative mitigation action is possible without hassle and wastage of time. Therefore, any failure in the technical installation due to implementation of an incorrect mitigation action is prevented.

One of the one or more mitigation actions is implemented in the virtual model until a preferred outcome is determined. Therefore, identification of an efficient mitigation action to resolve the fault condition is enabled.

The mitigation action with the preferred outcome may be performed in the technical installation. In an embodiment, the output of the mitigation action on the device may be associated with a time bound action. If no response is received from the user on the implementation of the mitigation action, the mitigation action may be performed or implemented automatically in the technical installation on the expiry of the scheduled time period. Advantageously, the timely implementation of the mitigation action prevents catastrophic disasters in the technical installation. Furthermore, the implementation of the mitigation action in the technical installation is not stalled for lack of response from the user of the technical installation.

In identifying the one or more mitigation actions, the method includes analyzing the fault condition to determine a fault pattern. The fault pattern may include, for example, real-time parameter values, estimated pre-defined threshold values and the deviation between the real-time parameter values and the pre-defined threshold values. The fault pattern may also provide the deviation in the values along with a time stamp. Therefore, the progress of the fault condition may also be analyzed. The method further includes mapping the fault pattern to a pre-defined matrix. The pre-defined matrix may include all the fault patterns identified and the corresponding mitigation actions implemented in the past, in the technical installation. The fault pattern is mapped to the pre-defined matrix and based on correlation one or more mitigation actions are identified. The method further includes determining from the pre-defined matrix one or more mitigation actions to resolve the analyzed fault condition. Advantageously, the pre-defined matrix enables accurate identification of one or more mitigation actions for the resolution of the fault condition.

An alert is generated on the device associated with the user of the technical installation. Such alert may be generated when a deviation is determined between the parameter values and the pre-defined threshold value. The alert may be, for example, in the form of a notification. Such notification may also include a sound-based alert. Advantageously, the alert enables efficient communication of the fault condition to the user of the technical installation.

The disclosure relates in one aspect to a system for eliminating a fault condition in a technical installation. The system includes one or more processing units, and one or more memory units coupled to the one or more processing units. The memory units include a fault elimination module. The fault elimination module may be configured to determining the fault condition of at least one device in the technical installation. A fault condition may be an abnormality or a defect in a device, component, unit or an equipment of the technical installation or a portion of the technical installation. The abnormality may also be caused due to an error in a process executed in the technical installation. Such abnormality may affect the functioning of the technical installation or in complete failure of the technical installation. Efficient identification of the fault condition enables accurate determination of corresponding mitigation actions. The fault elimination module may further be configured to determine a root cause of the predicted fault condition. A root cause of the fault condition may be the main factor or the initiating factor which causes a non-conformance in the device. Determination of the root cause of the fault condition enables accurate identification of mitigation actions to resolve such fault condition. The fault elimination module may further be configured to identify of one or more mitigation actions to resolve the fault condition. A mitigation action is an act or a process implemented to reduce or eradicate risk to human life and property from one or more events. Therefore, identification of one or more mitigation actions enables resolution of the fault condition, thereby allowing the technical installation to function efficiently. The fault elimination module may further be configured to determine an outcome associated with at least one of the one or more mitigation actions on the technical installation. The mitigation action, when implemented, may cause an effect in the technical installation, as an outcome. Determination of the effect of the mitigation action on the technical installation is important so as to identify if the preferred outcome of the mitigation action is achieved. Early identification of the outcome of the mitigation action enables effective utilization of time and resources in maintenance of the technical installation. The fault elimination module may further be configured to output the at least one mitigation action on a device associated with a user. If the outcome of the mitigation action is the preferred outcome, such mitigation action is outputted on the device associated with the user of the technical installation. Such user may be any entity responsible for the functioning and maintenance of the technical installation. Advantageously, the user of the technical installation is informed of the mitigation action in due time. Therefore, the implementation of the mitigation action is enabled efficiently.

In predicting the occurrence of the fault condition, the fault elimination module may be configured to obtain sensor data from the one or more sensors installed in the technical installation. Such one or more sensors may be configured to collect one or more parameter values associated with the at least one device in the technical installation. The sensor data may include real-time data associated with the device in the technical installation and such one or more parameter values may be associated with an event. The event may be, for example, associated with the fault condition. The event may be any occurrence or an activity in at least one portion of the technical installation. The event may be a part of an industrial process in the technical installation and may be associated with the functioning of a component forming a part of the industrial process. The parameters may be, for example, temperature, pressure, level of a fluid, etc. The fault elimination module may further be configured to process the obtained sensor data by a suitable machine learning model. Such machine learning model may be, for example, a neural network-based model that may be capable of processing the sensor data to predict the fault condition of the device based on historical and real-time data associated with the device in the technical installation. The fault elimination module may further be configured to predict the fault condition using one or more machine learning techniques. The machine learning model may employ one or more machine learning techniques to predict the fault condition of the device. Such one or more machine learning techniques may include supervised and unsupervised learning techniques. Advantageously, prediction of the fault condition of the device enables the user of the technical installation to initiate necessary actions before the actual fault condition develops in the device. Therefore, any loss and damage to the device in the technical installation is avoided.

In processing the obtained data, the fault elimination module may be configured to obtain an engineering data associated with the technical installation. Such engineering data may include, for example, function diagrams, plant displays, compound components, prototypes, runtime container types, runtime container numbers, peer to peer communication details, and types of automation servers. The fault elimination module may further be configured to obtain data from a piping and instrumentation diagram associated with the technical installation. Such piping and instrumentation diagram indicates one or more piping, vessels and components in a process flow along with instrumentation and control devices. The fault elimination module may further be configured to determine a type of industrial process being executed in the at least one portion of the technical installation based on the engineering data. The fault elimination module may further be configured to identify one or more components in the at least one portion of the technical installation. Such components may be a part of the determined industrial process. The industrial process may include several executable acts that may result in a specific outcome. Accurate and efficient execution of each of the executable acts is important for the functioning of the technical installation. The one or more components may be determined from the piping and instrumentation diagram. In an embodiment, the industrial process and/or the associated components may be identified using, for example, one or more tag information. The industrial processes and components in a technical installation may be associated with a tag information. Such tag information may include data related to, for example, process related identification, point of installation within installation units, location identification, etc. Therefore, such tag information may enable accurate determination of the fault condition. The fault elimination module may further be configured to identify a fault signal associated with the event. Such fault signal may be identified based on the sensor data. The fault elimination module may further be configured to map the fault signal to at least one of the one or more components and/or the type of the industrial process. Advantageously, the mapping of the fault signal to the components and/or the industrial process enables accurate prediction of the fault condition. Yet another advantage is that the location of the fault condition is determined accurately in the technical installation.

In identifying the fault signal, the fault elimination module may further be configured to compare the real-time parameter values with a pre-defined threshold value. Each parameter may have a pre-defined optimum value or a threshold value. A deviation in parameter value from such pre-defined threshold value may cause an abnormality in the industrial process or in the functioning of the technical installation. The pre-defined threshold value may be stored, for example, in the technical database. The fault elimination module may further be configured to determine if there is a deviation between the parameter values and the pre-defined threshold value. Such deviation may correspond to the fault signal.

The root-cause of the predicted fault condition is determined using a decision matrix. According to an embodiment, determination of the root cause of the fault condition using a decision matrix includes obtaining an engineering data associated with the technical installation. Such engineering data may include, for example, function diagrams, plant displays, compound components, prototypes, runtime container types, runtime container numbers, peer to peer communication details, and types of automation servers. The fault elimination module may further be configured to obtain data from a piping and instrumentation diagram associated with the technical installation. Such piping and instrumentation diagram indicates one or more piping, vessels and components in a process flow along with instrumentation and control devices. The fault elimination module may further be configured to determine a type of industrial process being executed in the at least one portion of the technical installation based on the engineering data. Such industrial process may be associated with the event. The industrial process may include several executable acts that may result in a specific outcome. Accurate and efficient execution of each of the executable acts is important for the functioning of the technical installation. The fault elimination module may further be configured to identify one or more components in the at least one portion of the technical installation. Such components may be a part of the determined industrial process. The one or more components may be determined from the piping and instrumentation diagram. In an embodiment, the industrial process and/or the associated components may be identified using, for example, one or more tag information. The industrial processes and components in a technical installation may be associated with a tag information. Such tag information may include data related to, for example, process related identification, point of installation within installation units, location identification, etc. Therefore, such tag information may enable accurate determination of the fault condition. The fault elimination module may further be configured to generate a questionnaire based on the identified one or more components and the type of industrial process and determining from the questionnaire the root cause of the fault condition in the technical installation. The decision matrix may use, for example, a decision tree flow. A questionnaire may be used to generate decision tree nodes. The questionnaire may be based on the tag information associated with the one or more components in the technical installation. Each decision tree node may process an internal node question and provide an output. Such output may be in the form of a branch, wherein such branch may have further sub-nodes. The decision tree branches may include options such as "Yes" and "No" for answers. If the answer to an internal node question is "Yes", a subsequent branch of the decision tree may be created. Such branch of decision tree may be created until the associated faulty components are identified. Alternatively, the decision tree may indicate the faulty component associated with the fault condition. The mapped component, therefore, advantageously indicates the fault condition.

A root cause analysis report may be created. Such report may include data associated with the one or more components and the industrial process associated with the technical installation determined using the decision matrix. Advantageously, the root cause analysis report provides the user of the technical installation concise information of the predicted fault condition and the associated cause.

In determining the outcome associated with at least one of the one or more mitigation actions, the fault elimination module may further be configured to implement one of the one or more mitigation actions in a virtual model of the technical installation. The virtual model may be a digital twin of the technical installation that is capable of simulating the functions of the technical installation. Such virtual model may be based in a cloud environment. In an embodiment, all the data associated with the functioning of the technical installation may be stored in the cloud environment. Such data may be used by the virtual model to simulate the functions of the technical installation. Advantageously, simulation of the functions of the technical installation enables timely identification of the appropriate mitigation action to mitigate the fault condition. The use of a virtual model further enables effective utilization of time and resources, thereby preventing wastage of effort in implementing an incorrect mitigation action in the technical installation. Therefore, the virtual model allows for prediction of the outcome of the mitigation action before such mitigation action is implemented in the technical installation in real-time. Implementation of the mitigation action may include executing the mitigation action in the virtual model. The fault elimination module may further be configured to predict using the virtual model an effect of the mitigation action on the technical installation. The virtual model may perform, for example, a predictive analysis based on the archived data and real-time information received from the technical installation. The predictive analysis may be based on patterns identified from the archived data, thereby enabling assessment of risk and potential associated with the mitigation action.

The fault elimination module may be configured to determine if the outcome of the implemented action is a preferred outcome. The effect caused by the implementation of the mitigation action in the virtual model of the technical installation enables identifying if the outcome of the mitigation action is the preferred outcome. The preferred outcome may include an outcome which generates a desired result in the technical installation, such that the fault condition is resolved. Alternatively, the preferred outcome may also include an outcome which furthers the cause of resolution of the fault condition in the technical installation. If the outcome is the preferred outcome, the mitigation action is outputted on the device associated with the user of the technical installation. The user of the technical installation may be informed of the preferred mitigation action so as to enable efficient and timely resolution of the fault condition. The output may be in the form of, for example, a notification on the device associated with the user. In an embodiment, such notification may include the details of the mitigation action, and a graphical user interface-based option to proceed with the implementation of the mitigation action in the technical installation. In an embodiment, if the outcome of the mitigation action is not the preferred outcome, another mitigation action from the one or more mitigation actions may be implemented in the virtual model. Advantageously, the outcome of the mitigation action may be predicted before the actual implementation of the mitigation action in the technical installation. Furthermore, if the preferred outcome is not achieved, the implementation of an alternative mitigation action is possible without hassle and wastage of time. Therefore, any failure in the technical installation due to implementation of an incorrect mitigation action is prevented.

One of the one or more mitigation actions is implemented in the virtual model until a preferred outcome is determined. Therefore, identification of an efficient mitigation action to resolve the fault condition is enabled.

The mitigation action with the preferred outcome may be performed in the technical installation. In an embodiment, the output of the mitigation action on the device may be associated with a time bound action. If no response is received from the user on the implementation of the mitigation action, the mitigation action may be performed or implemented automatically in the technical installation on the expiry of the scheduled time period. Advantageously, the timely implementation of the mitigation action prevents catastrophic disasters in the technical installation. Furthermore, the implementation of the mitigation action in the technical installation is not stalled for lack of response from the user of the technical installation.

In identifying the one or more mitigation actions, the fault elimination module may be configured to analyze the fault condition to determine a fault pattern. The fault pattern may include, for example, real-time parameter values, estimated pre-defined threshold values and the deviation between the real-time parameter values and the pre-defined threshold values. The fault pattern may also provide the deviation in the values along with a time stamp. Therefore, the progress of the fault condition may also be analyzed. The fault elimination module may further be configured to map the fault pattern to a pre-defined matrix. The pre-defined matrix may include all the fault patterns identified and the corresponding mitigation actions implemented in the past, in the technical installation. The fault pattern is mapped to the pre-defined matrix and based on correlation one or more mitigation actions are identified. The fault elimination module may further be configured to determine from the pre-defined matrix one or more mitigation actions to resolve the analyzed fault condition. Advantageously, the pre-defined matrix enables accurate identification of one or more mitigation actions for the resolution of the fault condition.

An alert is generated on the device associated with the user of the technical installation. Such alert may be generated when a deviation is determined between the parameter values and the pre-defined threshold value. The alert may be, for example, in the form of a notification. Such notification may also include a sound-based alert. Advantageously, the alert enables efficient communication of the fault condition to the user of the technical installation.

In yet another aspect, a system including one or more servers remotely located from a technical installation is disclosed. The system further includes one or more sensors communicatively coupled to the one or more servers and one or more user devices communicatively coupled to the one or more servers. The one or more servers include computer readable instructions, which when executed by the one or more servers cause the one or more servers to perform the method according to claims 1 to 13.

In one aspect, a process control system for operation of a process plant is disclosed. The process control system includes a system as claimed in claim 14.

In yet another aspect, a computer program product including a computer program, the computer program being loadable into a storage unit of a system, including program code sections to make the system execute the method when the computer program is executed in the system is disclosed.

In one aspect, a computer-readable medium, on which program code sections of a computer program are saved, the program code sections being loadable into and/or executable in a system to make the system execute the method when the program code sections are executed in the system is disclosed.

The realization of the disclosure by a computer program product and/or a computer-readable medium has the advantage that already existing management systems may be adopted by software updates in order to work as proposed by the disclosure.

The computer program product may be, for example, a computer program or include another element apart from the computer program. This other element may be hardware, for example a memory device, on which the computer program is stored, a hardware key for using the computer program and the like, and/or software, for example a documentation or a software key for using the computer program.

BRIEF DESCRIPTION OF THE ACCOMPANYING DRAWINGS

The present disclosure is further described hereinafter with reference to illustrated embodiments shown in the accompanying drawings, in which.

DETAILED DESCRIPTION

Figure 1:
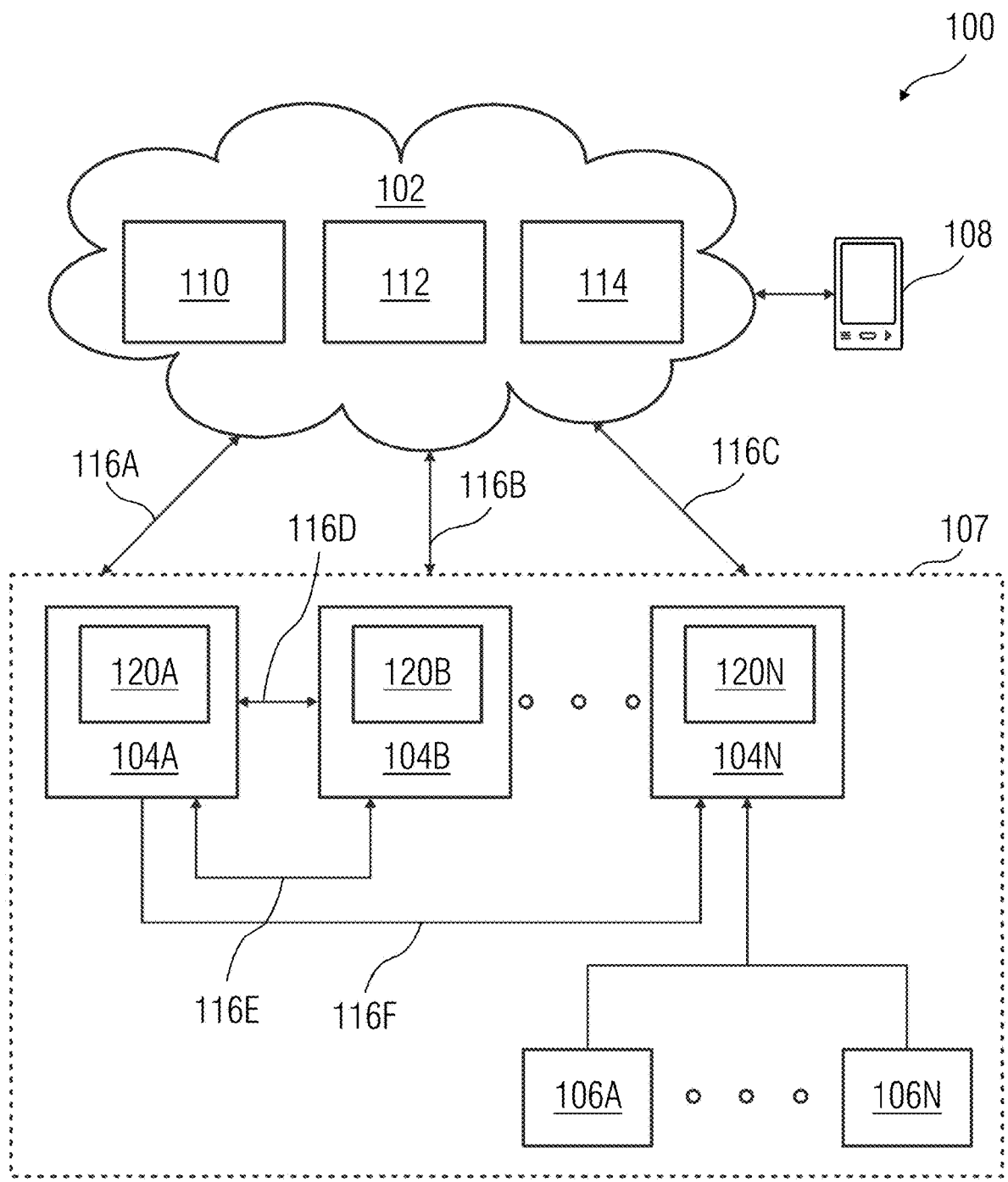
FIG. 1 depicts a schematic representation of an industrial set-up, according to a first embodiment.

A method and system for elimination of fault conditions in a technical installation is disclosed. Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 is a schematic representation of an industrial set-up 100, according to a first embodiment. The industrial set-up 100 includes a cloud platform 102, one or more technical installations 107 connected to the cloud platform 102, and a user device 108 associated with a user of the technical installation 107. The technical installation 107 may be an industrial setup such as manufacturing facility, power plant, etc. The technical installation 107 may be geographically distributed. Each of the technical installations 107 may include several devices or components 104A-N. The components 104A-N may include different types of assets (equipment, machines, sensors, actuators, etc.) located in the technical installation 107. Each of the components 104A-N is capable of communicating with the cloud platform 102 using respective communication interfaces 120A-N via communication links 116A-C via the Internet or a network. Also, the components 104A-N are capable of communicating with each other using respective communication interfaces 120A-N via communication links 116D to 116F. The communication links 116D to 116F may be wired or wireless links.

Also, in the technical installation 107, the one or more components 104N may be connected to assets 106A-N in the technical installation 107. Such assets 106A-N are not capable of directly communicating with the cloud platform 102. As shown in FIG. 1, the component 104N is connected to assets 106A-N via wired or wireless network. For example, the component 104N is an IoT gateway and the assets 106A-N may be robots, sensors, actuators, machines, or other field devices which communicate to the cloud platform 102 via the IoT gateway 104N.

Each of the components 104A-N is configured for communicating with the cloud platform 102 via the communication interfaces 120A-N. The components 104A-N may have an operating system and at least one software program for performing desired operations in the technical installation 107. Also, the components 104A-N may run software applications for collecting, and pre-processing plant data (process data) and transmitting the pre-processed data to the cloud platform 102.

The cloud platform 102 may be a cloud infrastructure capable of providing cloud-based services such as data storage services, data analytics services, data visualization services, etc. based on the plant data. The cloud platform 102 may be part of public cloud or a private cloud. The cloud platform 102 may enable data scientists/software vendors to provide software applications/firmware as a service, thereby eliminating a need for software maintenance, upgrading, and backup by the users. The software application may be full application, or software patch.

Figure 2:
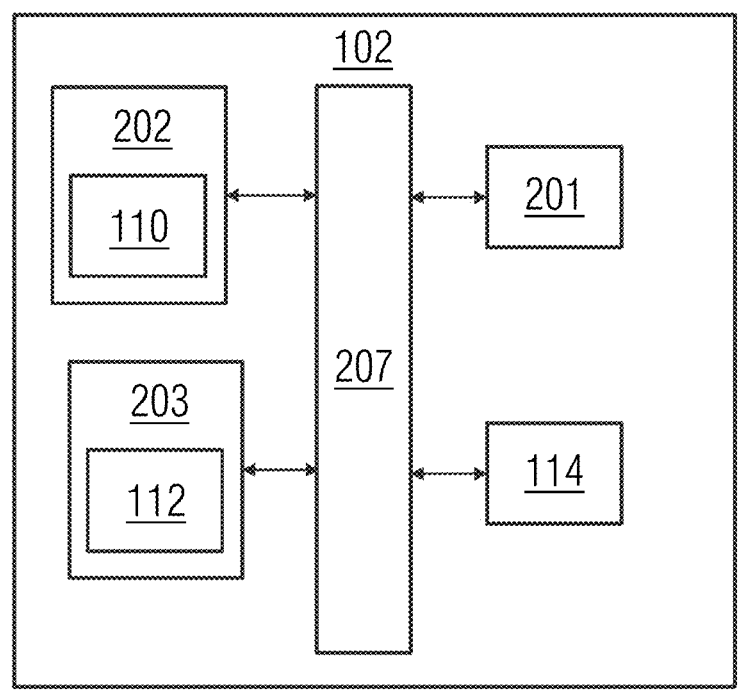
FIG. 2 depicts a block diagram of a cloud platform as shown in FIG. 1, according to the first embodiment.

The cloud platform 102 is further illustrated in greater detail in FIG. 2. Referring to FIG. 2, the cloud platform includes a processing unit 201, a memory 202, a storage unit 203, a network interface 114, a standard interface or bus 207. The cloud platform 102 may be an exemplary embodiment of a system. The system 102 may be a (personal) computer, a workstation, a virtual machine running on host hardware, a microcontroller, or an integrated circuit. As an alternative, the system 102 may be a real or a virtual group of computers (the technical term for a real group of computers is "cluster", the technical term for a virtual group of computers is "cloud").

The processing unit 201, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 201 may also include embedded controllers, such as generic or programmable logic devices or arrays, application specific integrated circuits, single-chip computers, and the like. In general, a processing unit 201 may include hardware elements and software elements. The processing unit 201 may be configured for multithreading, e.g., the processing unit 201 may host different calculation processes at the same time, executing the either in parallel or switching between active and passive calculation processes.

The memory 202 may be volatile memory and non-volatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes a fault elimination module 110 stored in the form of machine-readable instructions on any of the above-mentioned storage media and may be in communication to and executed by processing unit 201. When executed by the processing unit 201, the fault elimination module 110 causes the processing unit 201 to manage fault conditions that may occur in the technical installation 107. The fault elimination module may further cause the processing unit to predict an outcome of a mitigation action in the technical installation before the mitigation action is implemented in the technical installation. Method acts executed by the processing unit 201 to achieve the abovementioned functionality are elaborated upon in detail in FIGS. 3, 4, 5, 6, 7 and 8.

The storage unit 203 may be a non-transitory storage medium which stores a technical database 112. The technical database 112 may store an event history of the one or more components 104A-N in the technical installation 107. Additionally, the technical database 112 may also include machine learning based models to predict a fault condition in the technical installation 107 and to predict the outcome of a mitigation action on the technical installation 107. The bus 207 acts as interconnect between the processing unit 201, the memory 202, the storage unit 203, and the network interface 114.

Those of ordinary skill in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The present disclosure is not limited to a particular computer system platform, processing unit, operating system, or network. One or more aspects of the present disclosure may be distributed among one or more computer systems, for example, servers configured to provide one or more services to one or more client computers, or to perform a complete task in a distributed system. For example, one or more aspects of the present disclosure may be performed on a client-server system that includes components distributed among one or more server systems that perform multiple functions according to various embodiments. These components include, for example, executable, intermediate, or interpreted code, which communicate over a network using a communication protocol. The present disclosure is not limited to be executable on any particular system or group of systems, and is not limited to any particular distributed architecture, network, or communication protocol.

Disclosed embodiments provide systems and methods for eliminating a fault condition in a technical installation. In particular, the systems and methods may identify one or more mitigation actions for the fault condition and determine the outcome of the mitigation action in the technical installation before the implementation of such mitigation action in the technical installation.

Figure 3:
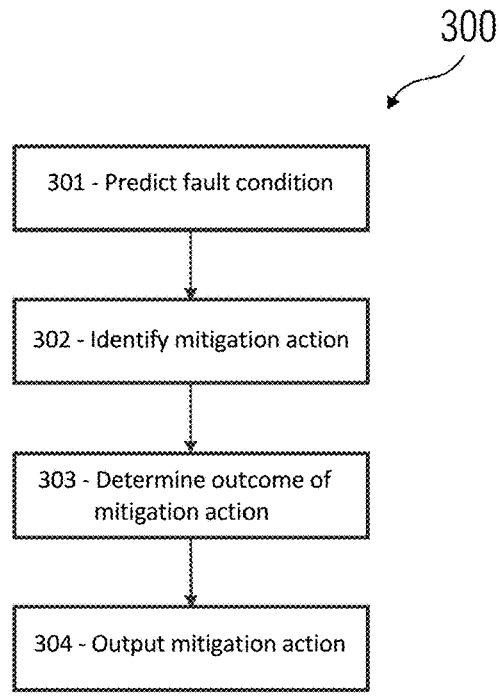
FIG. 3 illustrates a flowchart of a method of eliminating a fault condition in a technical installation, according to an embodiment.

FIG. 3 illustrates a flowchart of a method 300 of eliminating a fault condition in a technical installation 107, according to an embodiment. At act 301, the fault condition is predicted in the technical installation 107. A fault condition may be an abnormality or a defect in the functioning of the technical installation 107. Such malfunction may be caused due to, for example, a faulty component or a faulty process in the technical installation 107. The fault condition in the technical installation 107 may be predicted based on archived data and real-time data received from the one or more components 104A-N in the technical installation 107. The method acts for the prediction of the fault condition are described in detail in FIGS. 4, and 5. The root cause of the identified fault condition may also be identified. The method acts for the determination of the root cause of the fault condition are described in detail in FIG. 6. The method 300 further includes an act 302 of identifying one or more mitigation actions to resolve the fault condition. The one or more mitigation actions may be determined using a machine learning based model. In an embodiment, the machine learning based model is capable of analyzing a fault pattern associated with the fault condition. The fault pattern may include information related to industrial process acts and/or the components associated with the fault condition. Based on the analysis of the fault pattern, one or more mitigation actions may be identified. The method acts for the identification of one or more mitigations actions are described in detail in FIG. 7. The method 300 further includes a method act 303 of determining an outcome associated with at least one of the one or more mitigation actions on the technical installation 107. Such outcome may be determined, for example, using a virtual model of the technical installation 107. Therefore, the outcome of the mitigation action may be identified even before the implementation of such mitigation action in the technical installation 107. Therefore, the fault condition is efficiently managed in the technical installation 107 without causing damage to the technical installation 107. The method acts involved in the determination of the outcome of the mitigation actions is described in detail in FIG. 8. The method 300 further includes an act 304 of outputting at least one mitigation action on the device 108 associated with the user of the technical installation 107. Outputting the mitigation action to the device 108 enables timely notification of the solution to the user. Therefore, faster resolution of the fault condition is provided.

Figure 4:
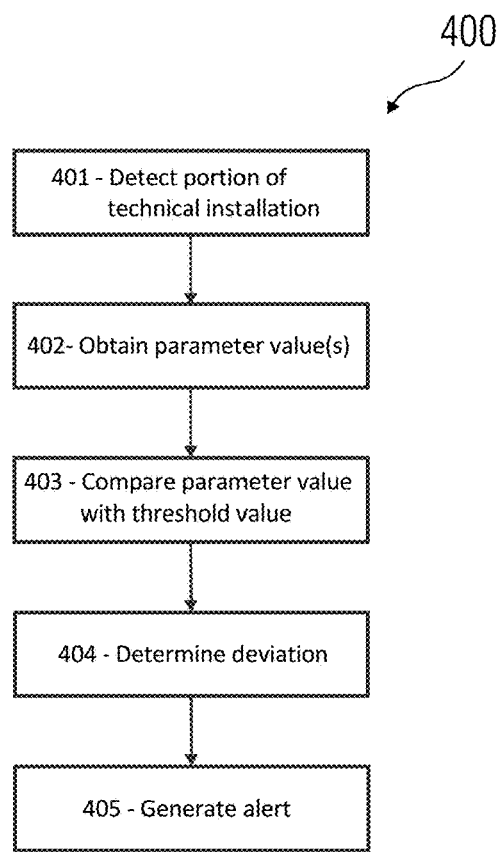
FIG. 4 illustrates a flowchart of a method predicting the fault condition in the technical installation, according to an embodiment.
Figure 5:
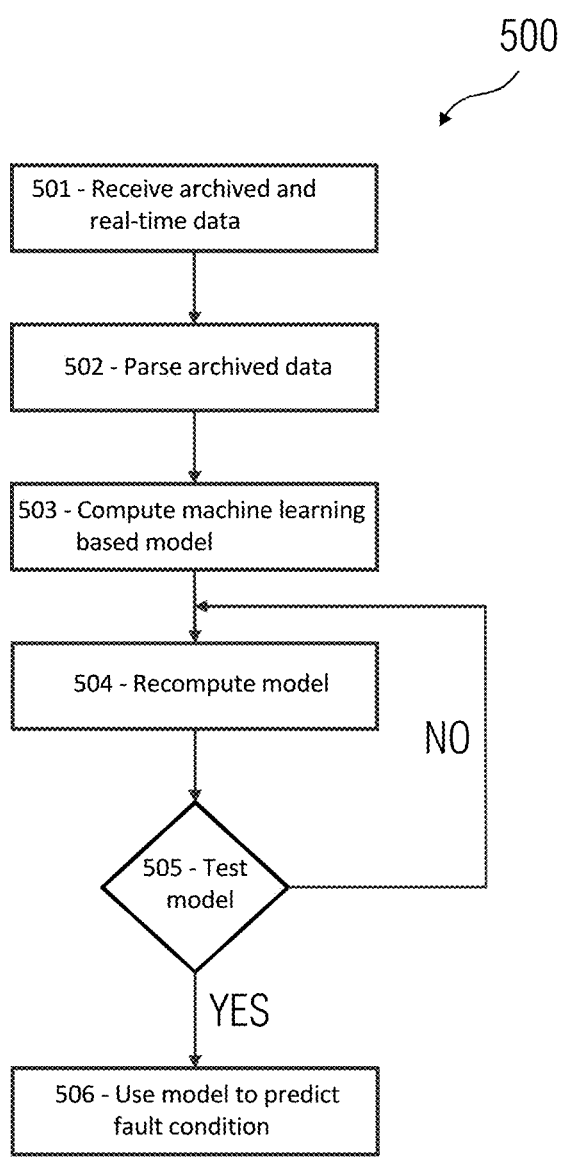
FIG. 5 illustrates a flowchart of a method of computing a machine learning based model for fault prediction and prediction of the fault condition using the machine learning based model, according to an embodiment.

FIG. 4 illustrates a flowchart of a method 400 of predicting the fault condition in the technical installation 107, according to an embodiment. At act 401 of the method, at least one event is detected in at least one portion of the technical installation. Such event is associated with the fault condition. The event may be, for example any occurrence in the technical installation 107 that is related to the functioning of the technical installation 107. The prediction of the fault condition based on the detected event is performed using a machine learning based model. The aspects of the machine learning based model are described further in FIG. 5. Referring to FIG. 5, a flowchart of a method 500 of computing the machine learning based model and fault prediction using the machine learning based model is illustrated. At act 501, archived data and real-time data associated with the technical installation 107 are received from the technical database 112. The archived data may include, but not limited to, data associated with one or more components 104A-N, data associated with industrial processes, event history of the components 104A-N, one or more industrial process parameter values, and pre-define threshold values associated with the process parameters. Additionally, the archived data may also include fault patterns identified in the past in the technical installation 107. Such fault patterns may be specific to the fault conditions and may indicate one or more components 104A-N or the industrial process associated with the fault condition. The real-time data is associated with the one or more components 104A-N in the technical installation 107 and includes one or more parameter values associated with the one or more components 104A-N, in real-time. Such real-time data is captured by one or more sensors 106A-N associated with the one or more components 104A-N. The sensors 106A-N may be configured to transmit the real-time data to the cloud platform 102. Such data may be stored in the technical database 112.

In an embodiment, archived data may be segregated into one or more categories, thereby enabling easier and faster prediction of the fault condition. The categories may include, for example, user data, configuration data, plant engineering data, security data, etc. The user data may include, for example, user authentication and credential information. The configuration data may include, for example, hardware configuration associated with the technical installation 107, software configurations associated with the technical installation 107, and network topology information. Plant engineering data may include, for example, function diagrams, plant displays, compound components, prototypes, runtime container types, runtime container numbers, peer to peer communication details, and types of automation servers. Security data may include, for example, firewall rules, data associated with malware prevention systems, demilitarized zone settings, etc.

At act 502 of the method 500, the archived data is parsed to obtain the plant engineering data. Such parsing may be performed, for example, using an automated learning algorithm. Each component 104A-N in the technical installation 107 is associated with a tag information. Such tag information may include, for example, process related code, point of installation code, location code, etc. Therefore, such tag information may enable accurate determination of the fault condition. Process related code may be process related identification of the components associated with mechanical, civil, electrical, control and instrumentation engineering. Point of installation code indicates identification of points of installation of electrical and control and instrumentation components in the technical installation 107. Location code enables identification of location of components on floors or in rooms and also of fire areas and topographical stipulations. Additional information may be extracted from piping and instrumentation diagram for the technical installation 107 to generate the machine learning based model. At act 503, the machine learning based model is computed based on the archived plant engineering data. At act 504 of the method 500, the machine learning based model is recomputed with real-time data obtained from the technical database 112. The real-time data is used to evaluate the machine learning based model. This incremental model is periodically updated using real-time data obtained from the technical installation 107 at regular intervals. At act 505, the model is tested to determine if the trained model is capable of accurately predicting the fault condition. If the fault condition is predicted based on test data, the model is used to predict the fault condition in real-time, at act 506. If the fault prediction is incorrect, the model may be recomputed to improve the efficiency.

Referring to FIG. 4, at act 402 of the method 400, one or more parameter values are obtained from sensors 106A-N installed in the technical installation 107. Such parameter values are associated with the detected event. Therefore, the parameter values are real-time values obtained from the sensors 106A-N. These parameter values are analyzed by the machine learning based model for prediction of a fault condition. At act 403, the one or more parameter values are compared with the pre-defined threshold values associated with the parameters. Each parameter may have an associated threshold value within which the parameter values lies. A deviation in the parameter value in comparison to the pre-defined threshold value may cause an abnormality in the functioning of the technical installation 107. The model, therefore, compares the real-time parameter values with the pre-defined threshold values. At act 404, a deviation between the one or more parameter values and the pre-defined threshold value is determined by the machine learning based model. The pre-defined threshold value may be a definite value or a range within which the parameter values may lie. A difference between the one or more parameter values and the pre-defined threshold value may be calculated to determine the deviation. In an embodiment, an estimate of the deviation from the pre-defined threshold value may also be provided to the user. The estimate may be, for example, a percentage value depicting the extent of deviation of the real-time parameter values when compared to the pre-defined threshold value. At act 405, an alert may be generated in the device 108 associated with the user of the technical installation 107 when a deviation is determined between the one or more parameter values and the pre-defined threshold value. In an embodiment, an alarm may also be generated in an alarm system installed in the technical installation 107.

Figure 6:
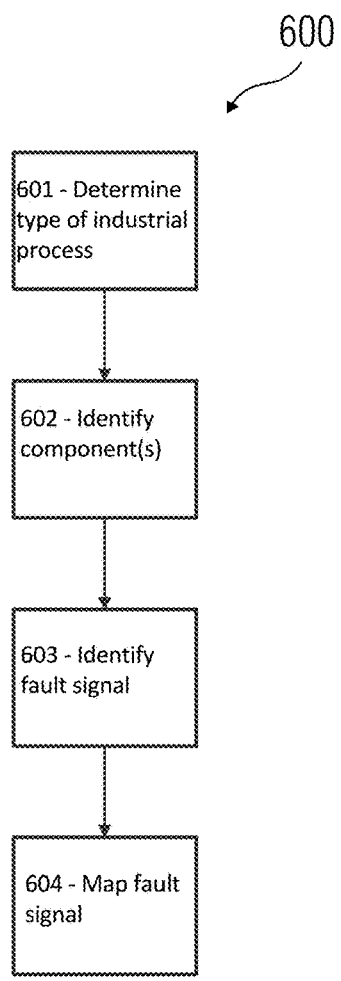
FIG. 6 illustrates a flowchart of a method of determining root cause of the fault condition, according to an embodiment.

FIG. 6 illustrates a flowchart of a method 600 of determining the root cause of the fault condition, according to an embodiment. At act 601 of the method 600, a type of industrial process being executed in the at least one portion of the technical installation 107, is determined. The industrial process may be associated with the detected event of the fault condition. Such portion of the technical installation 107 may be the portion where the fault condition may have occurred. The industrial process may include a plurality of executable acts that may be executed in the technical installation 107. At act 602, the one or more components 104A-N associated with the industrial process are identified. Therefore, determination of the industrial process enables easy identification of the associated components 104A-N. Hence, determination of the cause of the fault condition is faster and more efficient. At act 603, a fault signal associated with the event is identified. The fault signal may be depicted, for example, in the form of a waveform and may include the parameter value associated with the waveform, a time stamp at which a fault may have occurred, and the parameter associated with the parameter value. Such fault signal may be displayed, for example, in an operation control room of the technical installation 107. At act 604, the fault signal is mapped to the at least one or more components 104A-N and/or at least one of the plurality of the executable acts of the industrial process, to determine the fault condition. In an embodiment, the fault signal may be associated with one or more tag information. The tag information includes the codes (process-related code, location code and/or point of installation code, as described earlier). The rules or criteria for the prediction of the fault condition in the technical installation 107 are used to analyze the fault signal and the associated tag information. Based on the analysis, the mapping of the fault signal to the one or more components 104A-N in the technical installation 107 may be performed. In an embodiment, a decision matrix may be generated which may use a decision tree flow. A questionnaire may be used to generate decision tree nodes. Each decision tree node may process an internal node question and provide an output. Such output may be in the form of a branch, wherein such branch may have further sub-nodes. The decision tree branches may include options such as "Yes" and "No" for answers. If the answer to an internal node question is "Yes", a subsequent branch of the decision tree may be created. Such branch of decision tree may be created until the associated faulty components 104A-N are identified. Alternatively, the decision tree may indicate the faulty component 104A-N associated with the fault condition.

Figure 7:
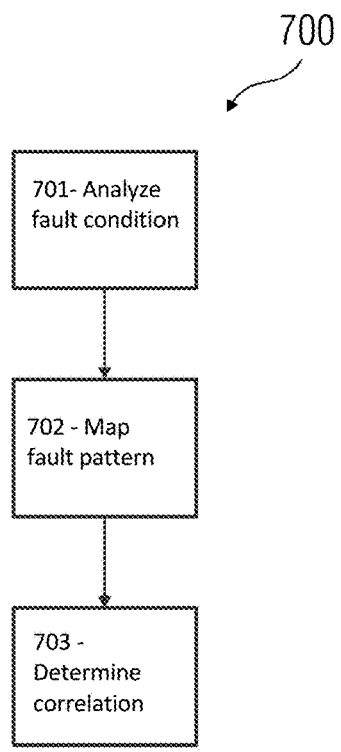
FIG. 7 illustrates a flowchart of a method of identifying one or more mitigation actions to resolve the fault condition, according to another embodiment.

FIG. 7 illustrates a flowchart of a method 700 of identifying one or more mitigation actions to resolve the fault condition, according to an embodiment. At act 701, the fault condition is analyzed to identify a fault pattern. The fault pattern may be a combination of the deviated parameter value, the associated faulty components 104A-N and/or the industrial process acts associated with the faulty components 104A-N. At act 702, the fault pattern is mapped to a pre-defined matrix. The pre-defined matrix may include all the fault patterns identified and the corresponding mitigation actions implemented in the past, in the technical installation 107. The fault pattern is mapped to the pre-defined matrix and based on correlation one or more mitigation actions are determined, at act 703.

Figure 8:
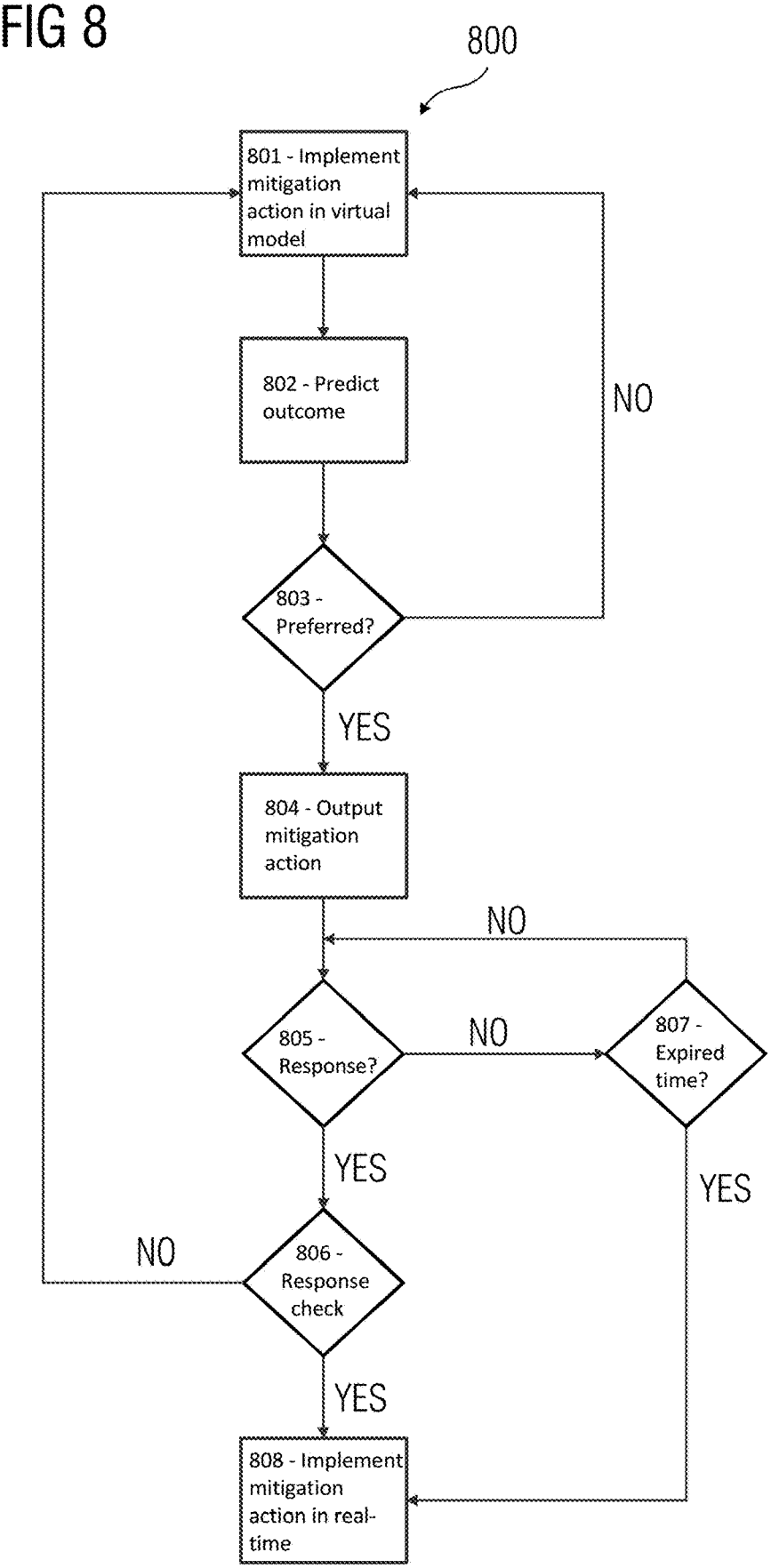
FIG. 8 illustrates a flowchart of a method of determining the outcome associated with the one or more mitigation actions, according to an embodiment.

FIG. 8 illustrates a flowchart of a method 800 of determining the outcome associated with the one or more mitigation actions, according to an embodiment. At act 801, one or more mitigation actions are implemented in a virtual model of the technical installation 107. The virtual model is a digital twin of the technical installation 107 that is capable of simulating the functions of the technical installation 107. Such virtual model may be based in the cloud platform 102. All data associated with the functioning of the technical installation 107 is stored in the cloud platform 102. Such data associated with the functioning of the technical installation 107 is used to generate the virtual model. The use of a virtual model enables effective utilization of time and resources, thereby preventing wastage of effort in implementing an incorrect mitigation action in the technical installation 107. At act 802 of the method 800, the outcome of the mitigation action is predicted using the virtual model. The implementation of the mitigation action in the virtual model may generate an effect in the virtual model of the technical installation 107. Such effect is identified as the outcome of the mitigation action. The effect may be, for example, a change in the parameter value associated with the mitigation action. For example, if the mitigation action is configured to bring about a change in a recorded temperature value in the virtual model, the effect caused by the implementation of the mitigation action may include an increase, decrease or no change in the recorded temperature value. Therefore, the outcome of the implementation of the mitigation action may be a preferred outcome or an undesired outcome. At act 803, a determination of the outcome being a preferred outcome, or an undesired outcome is made. A preferred outcome may be an outcome which generates a desired result in the technical installation 107. The preferred outcome may also be an outcome which furthers the cause of resolution of the fault condition in the technical installation 107. A predictive analysis is performed to determine the outcome of the implemented mitigation action. The predictive analysis determines the effect of the mitigation action on the parameter values associated with the mitigation action. If a deviation is identified from the preferred parameter value, the outcome may be an undesired outcome. If the outcome is the preferred outcome, at act 804, the mitigation action is outputted on the device 108 associated with the user of the technical installation 107. The user of the technical installation may be informed of the preferred mitigation action so as to enable efficient and timely resolution of the fault condition. The output may be in the form of, for example, a notification on the device 108 associated with the user. In an embodiment, such notification may include the details of the mitigation action, and a graphical user interface-based option to proceed with the implementation of the mitigation action in the technical installation. If the outcome of the mitigation action is not the preferred outcome, another mitigation action of the identified mitigation actions is implemented in the virtual model. In an embodiment, the mitigation actions are implemented in the virtual model until a preferred outcome is identified or until all the identified mitigation actions are exhausted.

At act 805 of the method 800, if a response is obtained from the user, at act 806 a check is made to determine if the response is "yes" or "no", wherein "yes" is indicative of the implementation of the mitigation action in the technical installation 107 and "no" is indicative of no implementation of the mitigation action in the technical installation 107. If the response is "yes", the mitigation action is implemented in the technical installation 107 in real-time, at act 808. In an embodiment, the notification indicating the preferred mitigation action may be time bound. Therefore, a scheduled time period is assigned to the notification within which a response is to be received from the user. Thus, at act 807 a check is made to determine if the scheduled time period has expired. If the scheduled time period has expired and the response is not received from the user before the expiry of the scheduled time period, the mitigation action is implemented in the technical installation 107 in real-time, at act 808. If the scheduled time period has not lapsed, no action is taken until the scheduled time period expires.

The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular mechanisms, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

The invention claimed is:

1. A method of eliminating a fault condition of at least one device in a technical installation, the method comprising:
predicting, by a processing unit, an occurrence of the fault condition of the device of the technical installation;
determining, by the processing unit, a root cause of the fault condition;
determining, by the processing unit, one or more mitigation actions to resolve the fault condition;
determining, by the processing unit, an outcome associated with at least one of the one or more mitigation actions on the technical installation, wherein the determining of the outcome comprises: implementing a mitigation action of the one or more mitigation actions in a virtual model of the technical installation, wherein the virtual model is configured to simulate functions of the technical installation; and predicting an effect of the implemented mitigation action on the technical installation using the virtual model;
determining whether the outcome of the implemented mitigation action in the virtual model is a preferred outcome; and
outputting, by the processing unit, the implemented mitigation action when the outcome is the preferred outcome, or implementing another mitigation action of the one or more mitigation actions in the virtual model when the outcome is not the preferred outcome.

2. The method of claim 1, wherein, in predicting the occurrence of the fault condition, the method comprises:
obtaining sensor data from one or more sensors installed in the technical installation, wherein the sensor data includes one or more parameter values associated with an event in the technical installation;
processing the obtained sensor data by a suitable machine learning model; and
predicting the fault condition using one or more machine learning techniques.

3. The method of claim 2, wherein, in processing the obtained sensor data, the method comprises:
obtaining an engineering data associated with the technical installation;
obtaining data from a piping and instrumentation diagram associated with the technical installation;
determining a type of industrial process being executed in at least one portion of the technical installation based on the engineering data;
identifying one or more components in the at least one portion of the technical installation, wherein the components are a part of the determined type of industrial process based on the piping and instrumentation diagram;
identifying a fault signal associated with the event, wherein the fault signal is identified based on the sensor data; and
mapping the fault signal to at least one of the one or more components and/or the type of industrial process.

4. The method of claim 3, wherein, in identifying the fault signal associated with the event, the method comprises:
comparing the one or more parameter values in the sensor data with a pre-defined threshold value; and determining a deviation between the one or more parameter values and the pre-defined threshold value, wherein the deviation between the one or more parameter values and the pre-defined threshold value corresponds to the fault signal.

5. The method of claim 1, wherein the root cause of the fault condition is determined using a decision matrix.

6. The method of claim 5, wherein the determination of the root cause of the fault condition using the decision matrix comprises:
 obtaining an engineering data associated with the technical installation;
 obtaining data from a piping and instrumentation diagram associated with the technical installation;
 determining a type of industrial process being executed in at least one portion of the technical installation based on the engineering data;
 identifying one or more components in the at least one portion of the technical installation, wherein the components are a part of the determined type of industrial process based on the piping and instrumentation diagram;
 generating a questionnaire based on the identified one or more components and the type of industrial process; and
 determining from the questionnaire the root cause of the fault condition in the technical installation.

7. The method of claim 6, further comprising;
 creating a root cause analysis report, wherein the root cause analysis report comprises data associated with the one or more components and the type of industrial process associated with the technical installation determined using the decision matrix.

8. The method of claim 1, wherein the one or more mitigation actions in the virtual model of the technical installation are implemented until the preferred outcome is determined.

9. The method of claim 5, further comprising:
 performing the mitigation action with the preferred outcome in the technical installation.

10. The method of claim 1, wherein, in identifying one or more mitigation actions, the method comprises:
 analyzing the fault condition to determine a fault pattern;
 mapping the fault pattern to a pre-defined matrix; and
 determining from the pre-defined matrix the one or more mitigation actions to resolve the analyzed fault condition.

11. The method of claim 4, further comprising:
 generating an alert when a deviation is determined between the parameter values and the pre-defined threshold value.

12. A system for eliminating a fault condition in a technical installation, the system comprising:
 one or more processing units; and
 one or more memory units coupled to the one or more processing units, wherein the one or more memory units comprises a fault elimination module configured to:
  predict an occurrence of the fault condition of a device of the technical installation;
  determine a root cause of the fault condition;
  determine one or more mitigation actions to resolve the fault condition;
  determine an outcome associated with at least one of the one or more mitigation actions on the technical installation, wherein the determination of the outcome comprises: an implementation of a mitigation action of the one or more mitigation actions in a virtual model of the technical installation, wherein the virtual model is configured to simulate functions of the technical installation; and a prediction of an effect of the implemented mitigation action on the technical installation using the virtual model;
  determine whether the outcome of the implemented mitigation action in the virtual model is a preferred outcome; and
  output the implemented mitigation action when the outcome is the preferred outcome, or implementing another mitigation action of the one or more mitigation actions in the virtual model when the outcome is not the preferred outcome.

13. A system comprising:
 one or more servers remotely located from a technical installation;
 one or more sensors communicatively coupled to the one or more servers; and
 one or more user devices communicatively coupled to the one or more servers,
 wherein the one or more servers comprise computer readable instructions, which, when executed by the one or more servers, cause the one or more servers to:
  predict an occurrence of a fault condition of a device of the technical installation;
  determine a root cause of the fault condition;
  determine one or more mitigation actions to resolve the fault condition;
  determine an outcome associated with at least one of the one or more mitigation actions on the technical installation, wherein the determination of the outcome comprises: an implementation of a mitigation action of the one or more mitigation actions in a virtual model of the technical installation, wherein the virtual model is configured to simulate functions of the technical installation; and a prediction of an effect of the implemented mitigation action on the technical installation using the virtual model;
  determine whether the outcome of the implemented mitigation action in the virtual model is a preferred outcome; and
  output the implemented mitigation action when the outcome is the preferred outcome, or implementing another mitigation action of the one or more mitigation actions in the virtual model when the outcome is not the preferred outcome.

14. A non-transitory computer readable medium on which program code sections of a computer program are saved, the program code sections being loadable into and/or executable in a system, wherein the program code sections, when executed in the system, cause the system to:
 predict an occurrence of a fault condition of a device of a technical installation;
 determine a root cause of the fault condition;
 determine one or more mitigation actions to resolve the fault condition;
 determine an outcome associated with at least one of the one or more mitigation actions on the technical installation, wherein the determination of the outcome comprises:
an implementation of a mitigation action of the one or more mitigation actions in a virtual model of the technical installation, wherein the virtual model is configured to simulate functions of the technical installation; and a prediction of an effect of the implemented mitigation action on the technical installation using the virtual model;

determine whether the outcome of the implemented mitigation action in the virtual model is a preferred outcome; and output the implemented mitigation action when the outcome is the preferred outcome, or implementing another mitigation action of the one or more mitigation actions in the virtual model when the outcome is not the preferred outcome.

\* \* \* \* \*